(12) United States Patent
Liu et al.

(10) Patent No.: US 7,840,458 B2
(45) Date of Patent: *Nov. 23, 2010

(54) INTERNET SETTLEMENT SYSTEM

(75) Inventors: Lynn Y. Liu, Cupertino, CA (US);
Xiaomei Guan, San Jose, CA (US);
Michael E. Hayden, Los Altos, CA (US); David Ling, San Francisco, CA (US)

(73) Assignee: iPass Inc., Redwood Shores, CA (US)

( * ) Notice: Subject to any disclaimer, the term of this patent is extended or adjusted under 35 U.S.C. 154(b) by 364 days.

This patent is subject to a terminal disclaimer.

(21) Appl. No.: 11/860,305

(22) Filed: Sep. 24, 2007

(65) Prior Publication Data
US 2008/0021995 A1 Jan. 24, 2008

Related U.S. Application Data

(63) Continuation of application No. 09/467,551, filed on Dec. 10, 1999, now abandoned, which is a continuation-in-part of application No. 08/727,996, filed on Oct. 9, 1996, now Pat. No. 5,898,780.

(60) Provisional application No. 60/017,682, filed on May 21, 1996.

(51) Int. Cl.
*G06Q 30/00* (2006.01)
(52) U.S. Cl. .............................. 705/32; 705/26; 705/27; 705/34; 705/39; 705/40; 455/408; 455/403; 455/456; 709/227
(58) Field of Classification Search ................... 705/26, 705/27, 32, 34, 39, 40; 455/408, 403, 456; 709/227
See application file for complete search history.

(56) References Cited

U.S. PATENT DOCUMENTS

| 4,922,486 | A | 5/1990 | Lidinsky et al. |
| 5,291,543 | A | 3/1994 | Freese et al. |
| 5,416,842 | A | 5/1995 | Aziz |
| 5,465,206 | A | 11/1995 | Hilt et al. |
| 5,483,445 | A | 1/1996 | Pickerin |
| 5,517,549 | A | 5/1996 | Lee |
| 5,517,555 | A | 5/1996 | Amadon et al. |

(Continued)

OTHER PUBLICATIONS

"About iPass", *iPass Inc.*, [online Jan. 1996] Retrieved from the Internet<URL:http://www.ipass.com/about-ipass/history.shtml>.

(Continued)

*Primary Examiner*—Nga B. Nguyen
(74) *Attorney, Agent, or Firm*—DeLizio Gilliam, PLLC

(57) ABSTRACT

A method and apparatus for collecting information about an event in which a user accesses the Internet through the system of a first Internet Service Provider with whom the user does not have an account. The apparatus includes a first server that creates a record of the user's Internet usage and sends the record to a second server. The second server collects records from a plurality of Internet Service Providers and forwards the records to a third server on a regular basis. The third server processes the data in the plurality of records and generates a report showing how much money the first Internet Service Provider is owed for allowing the user to access the Internet through the system of the first Internet Service Provider.

20 Claims, 11 Drawing Sheets

U.S. PATENT DOCUMENTS

| | | | |
|---|---|---|---|
| 5,596,643 | A | 1/1997 | Davis et al. |
| 5,606,497 | A | 2/1997 | Cramer et al. |
| 5,615,351 | A | 3/1997 | Loeb |
| 5,623,601 | A | 4/1997 | Vu |
| 5,633,919 | A | 5/1997 | Hogan et al. |
| 5,649,187 | A | 7/1997 | Hornbuckle |
| 5,659,601 | A | 8/1997 | Cheslog |
| 5,666,107 | A | 9/1997 | Lockhart et al. |
| 5,696,901 | A | 12/1997 | Konrad |
| 5,727,002 | A | 3/1998 | Miller et al. |
| 5,732,127 | A | 3/1998 | Hayes |
| 5,768,521 | A | 6/1998 | Dedrick |
| 5,787,347 | A | 7/1998 | Yu et al. |
| 5,793,762 | A | 8/1998 | Penners et al. |
| 5,794,221 | A | 8/1998 | Egendorf |
| 5,797,097 | A | 8/1998 | Roach, Jr. et al. |
| 5,852,812 | A | 12/1998 | Reeder |
| 5,867,661 | A | 2/1999 | Bittinger et al. |
| 5,893,077 | A | 4/1999 | Griffin |
| 5,898,780 | A | 4/1999 | Liu et al. |
| 5,913,160 | A | 6/1999 | Leung |
| 5,920,821 | A | 7/1999 | Seazholtz et al. |
| 6,006,090 | A | 12/1999 | Coleman et al. |
| 6,047,327 | A | 4/2000 | Tso et al. |
| 6,324,404 | B1 | 11/2001 | Dennison et al. |

OTHER PUBLICATIONS

"About iPass", *iPass Inc.*, [online Jan. 1996] Retrieved from the Internet<URL:http://www.ipass.com/about-ipass/management-team.shtml>,(Retrieved Jan. 27, 1997),1-2.

"Become a Global Provider Today", *iPass Services* [*online*] *Retrieved from the internet*: URLhttp://www.ipass.com/services/isp.html.

"International Equality", *Network World*, vol. 13, No. 21, (May 20, 1996),p. 6.

"iPass Services—Service Overview (Whitepaper)", *web page*, http//www.ipass.com/services/isp-whitepaper.html, (Oct. 28, 1998),1-12.

"ISPs Target Remote Users", *Network World*, vol. 13, No. 17, (Apr. 22, 1996),p. 16.

"More on PSA Acquisition of UK Inernet Provider", *Newsbytes News Network*, (Jun. 23, 1995).

"Our Services", *iPass Inc. Retrieved from the Internet*:<http://www.ipass.com/internet-roaming/white-paper.shtml#1>, [online Jan. 1996].

"Our Services", *iPass Inc. Retrieved from the Internet*:<http://www.ipass.com/internet-roaming/billing-usage.shtml>, [online Jan. 1996].

"True Global Internet Roaming", *iPass Inc.* [*online*] *Retrieved from the Internet*: <http://www.ipass.com>.

"Your Guide to Global Internet Roaming", *iPass Inc. Marketing Brochure*, (1997),1-2.

Rigney, C., "Remote Authentication Dial in User Service-draft application", ftp://ftp.livingston.com/pub/ra...draft-ieff-radius-radius-02.txt, (Feb. 1996),1-57.

"U.S. Appl. No. 08/727,996 Office Action", Mar. 26, 1998.
"U.S. Appl. No. 08/949,068 Office Action", Apr. 5, 1999.
"U.S. Appl. No. 09/467,551 Final Office Action", Jun. 13, 2003.
"U.S. Appl. No. 09/467,551 Final Office Action", Jul. 27, 2004.
"U.S. Appl. No. 09/467,551 Office Action", Feb. 24, 2005.
"U.S. Appl. No. 09/467,551 Office Action", May 22, 2002.
"U.S. Appl. No. 09/467,551 Office Action", Nov. 29, 2005.
"U.S. Appl. No. 09/467,551 Office Action", Dec. 24, 2003.

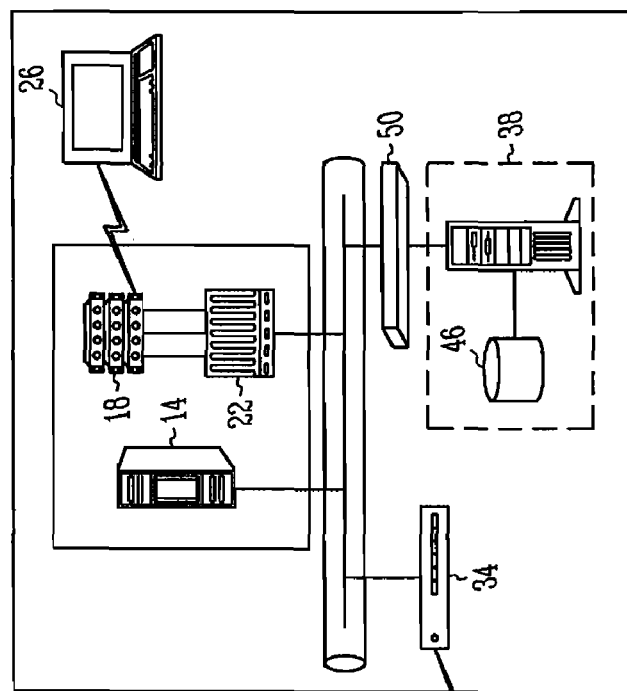
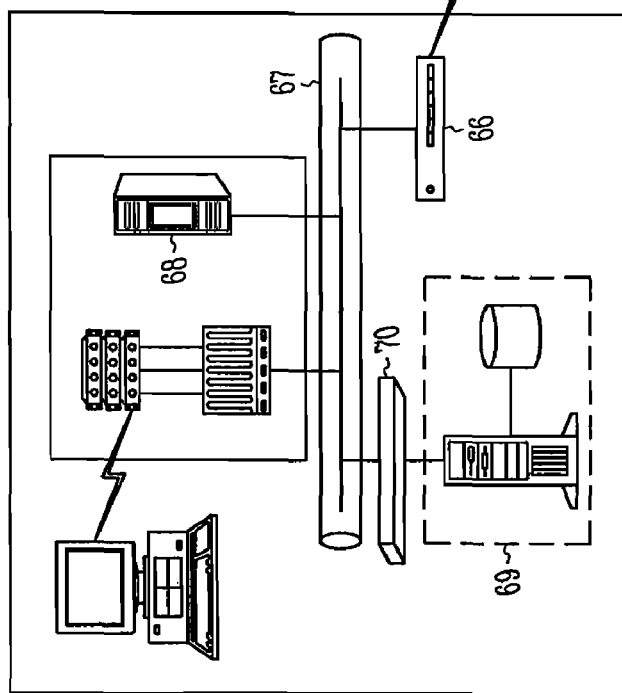
FIG. 3

SETTLEMENT DETAIL REPORT FOR: ISP_A
COUNTRY: COUNTRY_1

INTERNET ROAMING ACTIVITY FOR PERIOD: 7/1/1997 THROUGH 7/31/1997

| COUNTRY | ACTIVITY WITH OTHER GRIC MEMBERS | YOUR CUSTOMERS | | OTHER GRIC MEMBER'S CUSTOMERS | |
|---|---|---|---|---|---|
| | | TOTAL MINUTES | TOTAL CONNECTIONS | TOTAL MINUTES | TOTAL CONNECTIONS |
| COUNTRY_2 | ISP_B | 0 | 0 | 108 | 28 |
| | user1@isp_b | | | 108 | 28 |
| COUNTRY_3 | ISP_C | 9 | 2 | 0 | 0 |
| | user1@isp_a | 9 | 2 | | |
| COUNTRY_3 | ISP_D | 64 | 8 | 0 | 0 |
| | user1@isp_a | 64 | 8 | | |
| COUNTRY_4 | ISP_E | 19 | 8 | 0 | 0 |
| | user1@isp_a | 4 | 3 | | |
| | user1@isp_a | 15 | 5 | | |
| COUNTRY_5 | ISP_F | 0 | 0 | 377 | 8 |
| | user1@isp_f | | | 377 | 8 |
| COUNTRY_6 | ISP_G | 0 | 0 | 9 | 6 |
| | user1@isp_g | | | 9 | 6 |
| COUNTRY_7 | ISP_H | 0 | 0 | 189 | 6 |
| | user1@isp_h | | | 189 | 6 |
| COUNTRY_8 | ISP_I | 424 | 15 | 0 | 0 |
| | user1@isp_a | 88 | 6 | | |
| | user1@isp_a | 336 | 9 | | |
| COUNTRY_9 | ISP_J | 0 | 0 | 133 | 42 |
| | user1@isp_j | | | 133 | 42 |
| | TOTALS | 516 | 33 | 816 | 90 |

*FIG. 8*

SETTLEMENT SUMMARY REPORT FOR: ISP_A
COUNTRY: COUNTRY_1

INTERNET ROAMING ACTIVITY FOR PERIOD: 7/1/1997 THROUGH 7/31/1997

| COUNTRY | ACTIVITY WITH OTHER GRIC MEMBERS | YOUR CUSTOMERS | | OTHER GRIC MEMBER'S CUSTOMERS | | NET ACTIVITY | |
|---|---|---|---|---|---|---|---|
| | | TOTAL MINUTES | TOTAL CONNECTIONS | TOTAL MINUTES | TOTAL CONNECTIONS | MINUTES | CONNECTIONS |
| COUNTRY_2 | ISP_B | 0 | 0 | 108 | 28 | -108 | -28 |
| COUNTRY_3 | ISP_C | 9 | 2 | 0 | 0 | 9 | 2 |
| COUNTRY_3 | ISP_D | 64 | 8 | 0 | 0 | 64 | 8 |
| COUNTRY_4 | ISP_E | 19 | 8 | 0 | 0 | 19 | 8 |
| COUNTRY_5 | ISP_F | 0 | 0 | 377 | 8 | -377 | -8 |
| COUNTRY_6 | ISP_G | 0 | 0 | 9 | 6 | -9 | -6 |
| COUNTRY_7 | ISP_H | 0 | 0 | 189 | 6 | -189 | -6 |
| COUNTRY_8 | ISP_I | 424 | 15 | 0 | 0 | 424 | 15 |
| COUNTRY_9 | ISP_J | 0 | 0 | 133 | 42 | -133 | 42 |
| | TOTALS | 516 | 33 | 816 | 90 | -300 | -57 |

STATEMENT DATE: 8/2/97

*FIG. 9*

SETTLEMENT INVOICE REPORT FOR: ISP_A
COUNTRY: COUNTRY_1

INTERNET ROAMING ACTIVITY FOR PERIOD: 7/1/1997 THROUGH 7/31/1997

| COUNTRY | ACTIVITY WITH OTHER GRIC MEMBERS | YOUR CUSTOMER'S FEES | | | OTHER CUSTOMER'S FEES | | | ARS HANDLE FEES | | |
|---|---|---|---|---|---|---|---|---|---|---|
| | | TOTAL MINUTES FEES | TOTAL CONNECTIONS FEES | AMOUNTS | TOTAL MINUTES FEES | TOTAL CONNECTIONS FEES | AMOUNTS | TOTAL MINUTES FEES | TOTAL CONNECTIONS FEES | AMOUNTS |
| COUNTRY_2 | ISP_B | 0.00 | 0.00 | 0.00 | 3.60 | 2.80 | 6.40 | 0.00 | 0.00 | 0.00 |
| COUNTRY_3 | ISP_C | 0.30 | 0.20 | 0.50 | 0.00 | 0.00 | 0.00 | 0.12 | 0.20 | 0.32 |
| COUNTRY_3 | ISP_D | 2.13 | 0.80 | 2.93 | 0.00 | 0.00 | 0.00 | 0.85 | 0.80 | 1.65 |
| COUNTRY_4 | ISP_E | 0.63 | 0.80 | 1.43 | 0.00 | 0.00 | 0.00 | 0.25 | 0.80 | 1.05 |
| COUNTRY_5 | ISP_F | 0.00 | 0.00 | 0.00 | 12.57 | 0.80 | 13.37 | 0.00 | 0.00 | 0.00 |
| COUNTRY_6 | ISP_G | 0.00 | 0.00 | 0.00 | 0.30 | 0.60 | 0.90 | 0.00 | 0.00 | 0.00 |
| COUNTRY_7 | ISP_H | 0.00 | 0.00 | 0.00 | 6.30 | 0.60 | 6.90 | 0.00 | 0.00 | 0.00 |
| COUNTRY_8 | ISP_I | 14.13 | 1.50 | 15.63 | 0.00 | 0.00 | 0.00 | 5.65 | 1.50 | 7.15 |
| COUNTRY_9 | ISP_J | 0.00 | 0.00 | 0.00 | 4.43 | 4.20 | 8.63 | 0.00 | 0.00 | 0.00 |
| | TOTALS | 17.19 | 3.30 | 20.49 | 27.20 | 9.00 | 36.20 | 6.87 | 3.30 | 10.17 |

STATEMENT DATE: 8/2/97

*FIG. 10*

SETTLEMENT CREDIT/DEBIT REPORT FOR: ISP_A
COUNTRY: COUNTRY_1

INTERNET ROAMING ACTIVITY FOR PERIOD: 7/1/1997 THROUGH 7/31/1997

| COUNTRY | ACTIVITY WITH OTHER GRIC MEMBERS | CREDITS | DEBITS |
|---|---|---|---|
| COUNTRY_2 | ISP_B | 6.40 | 0.00 |
| COUNTRY_3 | ISP_C | 0.00 | 0.50 |
| COUNTRY_3 | ISP_D | 0.00 | 2.93 |
| COUNTRY_4 | ISP_E | 0.00 | 1.43 |
| COUNTRY_5 | ISP_F | 13.37 | 0.00 |
| COUNTRY_6 | ISP_G | 0.90 | 0.00 |
| COUNTRY_7 | ISP_H | 6.90 | 0.00 |
| COUNTRY_8 | ISP_I | 0.00 | 15.63 |
| COUNTRY_9 | ISP_J | 8.63 | 0.00 |
| ARS HANDLE FEES | | | 10.17 |
| | TOTALS | 36.20 | 30.66 |
| | NET | 5.54 | 0 |

STATEMENT DATE: 8/2/97    AimQuest OWES YOU THIS AMOUNT: $5.54

*FIG. 11*

INTERNET SETTLEMENT SYSTEM

This application is a continuation of Ser. No. 09/467,551, filed on Dec. 10, 1999 now abandoned which is a continuation-in-part of Ser. No. 08/727,996, filed on Oct. 9, 1996, now U.S. Pat. No. 5,898,780 which claims priority of provisional application No. 60/017,682, filed on May 21, 1996.

TECHNICAL FIELD

The present invention relates to an accounting system used by Internet Service Providers (ISP) and more particularly to a system that tracks the amount of time a user is connected to the Internet through a system operated by a first ISP. A settlement operator receives this information and uses it to generate a report which is forwarded to a second ISP who is responsible for paying for the amount of time the user was connected to the Internet through the system operated by the first ISP.

BACKGROUND ART

The use of the Internet has become such an important part of daily life that travelers like to be able to access the Internet when they are traveling. Typically, a person accesses the Internet through a company referred to as an Internet Service Provider (ISP). The user establishes an account with their home ISP and can then access the Internet by connecting to the ISP's Internet access system using a modem. The ISP bills the user for this service at some regular interval.

A problem encountered by travelers is that when they are traveling, connecting to their home ISP frequently means placing a long distance call. Such a call is not only expensive, but it fails to take advantage of the benefits of the Internet. Frequently, regardless of where the traveler is traveling, there are local ISP's in the area. However, in the past, since the traveler did not have an account with these ISP's, he or she could not log on to the Internet through these local ISP's. Recently, techniques have become available for allowing a traveler to use the system of a local ISP to connect to the Internet, even though the user does not have an account with the local ISP (this is referred to as Internet roaming). However, what is needed is a convenient system for allowing the fees incurred in this roaming process to be tracked and reported to the appropriate parties.

SUMMARY OF THE PRESENT INVENTION

Briefly, the present invention comprises a method and apparatus for tracking the amount of time a user is connected to the Internet through the system of a first Internet Service Provider with whom the user does not have an account. A first server is used to track the amount of time the user is connected to the Internet through the system of the first Internet Service Provider.

A user record is transmitted from the first server to a central settlement server. The user record comprises data that at least includes an identifier for the first user and the amount of time the first user was connected to the Internet through the first system. In the preferred embodiment, a second server is used to store a plurality of user records before they are transmitted to the central settlement server. The central settlement server generates a report from the user record which, includes the amount of time the first user was connected to the Internet through the first system. The report is then provided to the first Internet Service Provider by mail, fax or over the Internet. Typically, the report will include a listing of a plurality of users who have utilized the first Internet Service Provider's system. A similar report is also sent to a second Internet Service Provider with whom the user does have an account, so that the second Internet Service Provider can bill the user for his or her usage of the Internet. A combined report can be sent to each Internet Service Provider which offsets the credits and debits for the Internet Service Provider to show a net balance for the Internet Service Provider.

The apparatus includes a first server that creates a record of the user's Internet usage and sends the record to a second server. The second server collects records from a plurality of Internet Service Providers and forwards the records to a third server (the central settlement server) on a regular basis. The third server processes the data in the plurality of records and generates a report showing how much money the first Internet Service Provider is owed for allowing the user to access the Internet through the system of the first Internet Service Provider.

BRIEF DESCRIPTION OF THE DRAWINGS

FIG. 3 is a schematic view of a remote user authentication server connected to a home internet service provider server via the Internet;

FIG. 8 is a detail report generated according to the present invention;

FIG. 9 is a summary report generated according to the present invention;

FIG. 10 is an invoice report generated according to the present invention;

FIG. 11 is a credit/debit settlement report generated according to the present invention.

DETAILED DESCRIPTION OF THE PREFERRED EMBODIMENT

Figure 1:
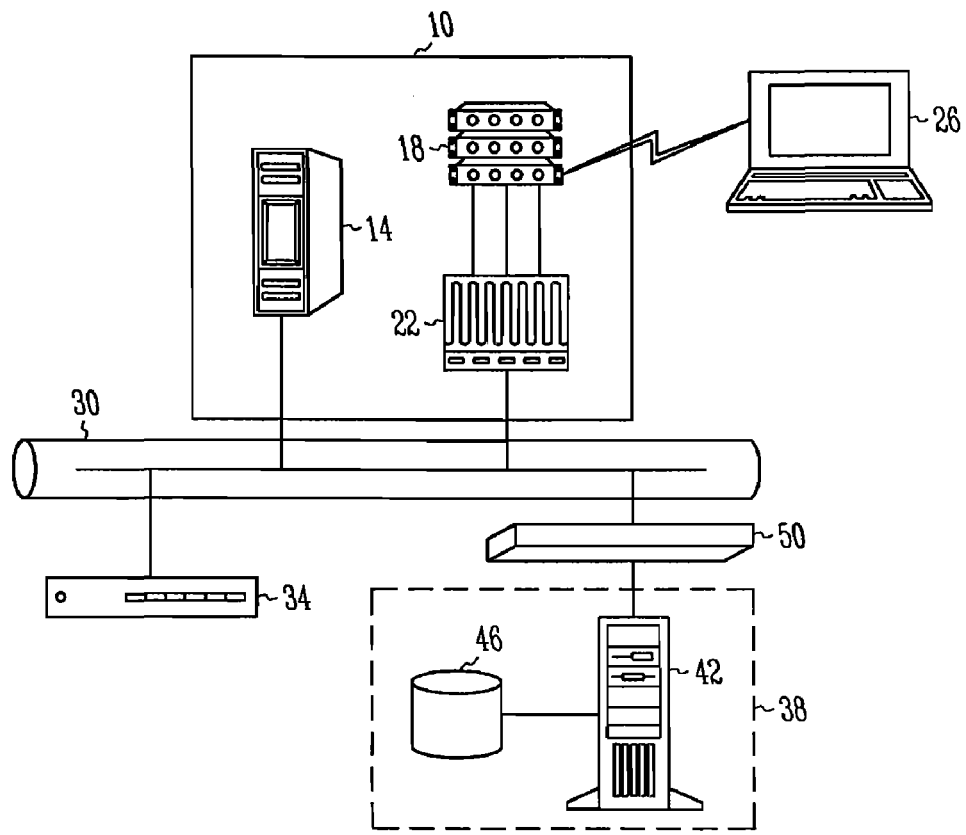
FIG. 1 is a schematic view of a system that utilizes a remote user authentication server.

FIG. 1 is a schematic diagram of a remote user network access system 10 comprised of a remote user authentication server 14, a modem rack 18, a communication server 22, and a remote computer 26. A remote computer 26 is connected to the modem rack 18 by a standard telephone link. The modem rack 18 is connected to the communication server 22 (also referred to as a Network Access Server or NAS) which is connected to the remote user authentication server 14 by an Internet protocol (IP) addressable network 30, such as a local area network (LAN) or a wide area network (WAN). A router 34 is also connected to the network 30 for routing communications to other IP addressable networks. The router 34 is a commercially available hardware system and provides a connection between the network 30 and the Internet. In this application, the term Internet refers to a global communications network.

An optional customer billing module 38 can be connected to the network 30 for collecting user information for billing purposes. The billing module 38 comprises a server 42 and a customer database 46. Typically, the module 38 is protected by a firewall 50 so as to inhibit unauthorized access to the billing module 38

The remote computer 26 can be any type of computer equipped with a modem, such as a standard laptop computer. The modem rack 18 includes a plurality of modems so that a plurality of remote computers 26 can access the system 10. The communication server 22 is a standard communication server that functions to connect the remote computer 26 to the network 30.

Figure 2:
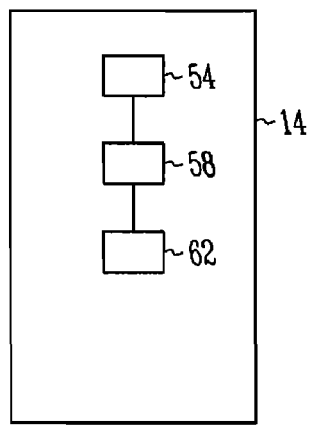
FIG. 2 is a block diagram of the software loaded on the remote user authentication server.

The remote user authentication server 14 comprises a commercially available user authentication server that has been modified with novel software to perform the functions illustrated in FIG. 2. Commercially available servers that are suitable for this purpose include Radius type servers originally developed by Livingston Enterprises (Radius is an acronym for Remote Authentication Dial In User Service). Similarly, a TACACS+ protocol and a TACACS+ protocol server can also be used as the server 14 (TACACS+ is a general purpose customer authentication protocol available from Cisco Systems Inc.).

FIG. 2 illustrates that the server 14 includes a plurality of software modules such as a user recognition module 54, a host table module 58 and a connection time log 62. The host table module 58 is a listing by domain name of Internet Service Providers who have an account with the local Internet Service Provider. The connection time log module 62 is a module that keeps track of the time a user is logged onto the Internet, typically for billing purposes, by recording log in and log out information. The user recognition module 54 is discussed in more detail with respect to FIG. 4 below.

FIG. 3 illustrates a connection between a local system 63 (i.e. the local network of a local Internet Service Provider) and a home Internet Service Provider system 64 via an Internet connection 65. A router 66 transfers information sent by the router 34 from the Internet connection 65 to a home network 67, such as a LAN or WAN. A user authentication server 68 and an optional billing system 69 are connected to the network 67. Typically, a firewall 70 protects the billing system 69 from unauthorized access. The system 63 and 64 illustrate a peer-to-peer system because the authentication server 14 knows the IP address of the server 68 without having to retrieve it from another server.

Figure 4:
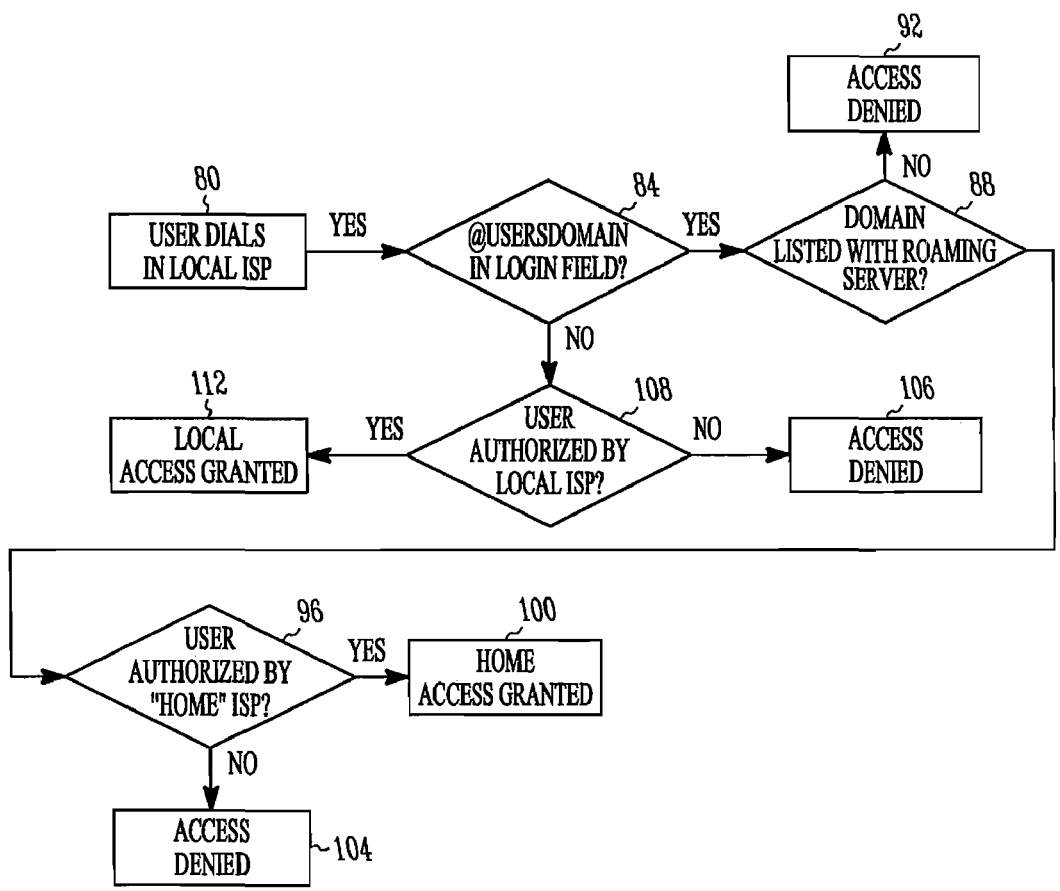
FIG. 4 is a flow chart illustrating the method used to provide remote user access to the Internet.

FIG. 4 illustrates the functions performed by the user recognition module 54. In block 80, a user has used the remote computer 26 to connect to the modem rack 18 of a local Internet Service Provider. In the method of the present invention a user who is not a customer of the local Internet Service Provider logs in using the following format: a user identifier plus a home ISP identifier plus a password. For example, an acceptable login format might be of the form username@userdomain, where the term userdomain is the domain name of the user's home Internet Service Provider, and the term user name is the user identification used with the user's home Internet Service Provider. For example, the login could be jdoe@aimnet.com, which is a typical e-mail address. Normally a password will also be used in the login process.

In block 84, the user recognition module 54 looks to see if the home ISP identifier, for example the term @userdomain, is in the login field. If it is, then in block 88, the home ISP identifier is checked against the host table 58 (shown in FIG. 2) to verify that the home ISP identifier (i.e. the user's home Internet Service Provider) is registered with the local Internet Service Provider. Block 92 illustrates that access to the Internet is denied if the home ISP identifier is not listed in the host table 58. If the home ISP identifier is listed in the host table 58, the server 14 routes the username (and password) to the home Internet Service Provider system 64 via the router 34, the Internet link 65 and the router 66. In block 96, the user authentication server 68 then verifies that the user is a customer of the home Internet Service Provider (e.g. has an account and is in good standing). If the server 68 decides that the user is a customer of the home Internet Service Provider, then in block 100, the server 68 sends an authorization message back to the local Internet Service Provider system 63, via the Internet connection 65. Alternatively, the server 68 can deny authorization as indicated at block 104.

In block 84, if an identifier for the home ISP is not present, then the server 14 checks to see if the user is a customer of the local ISP, and hence is authorized to use the system 63 at block 112.

Figure 5:
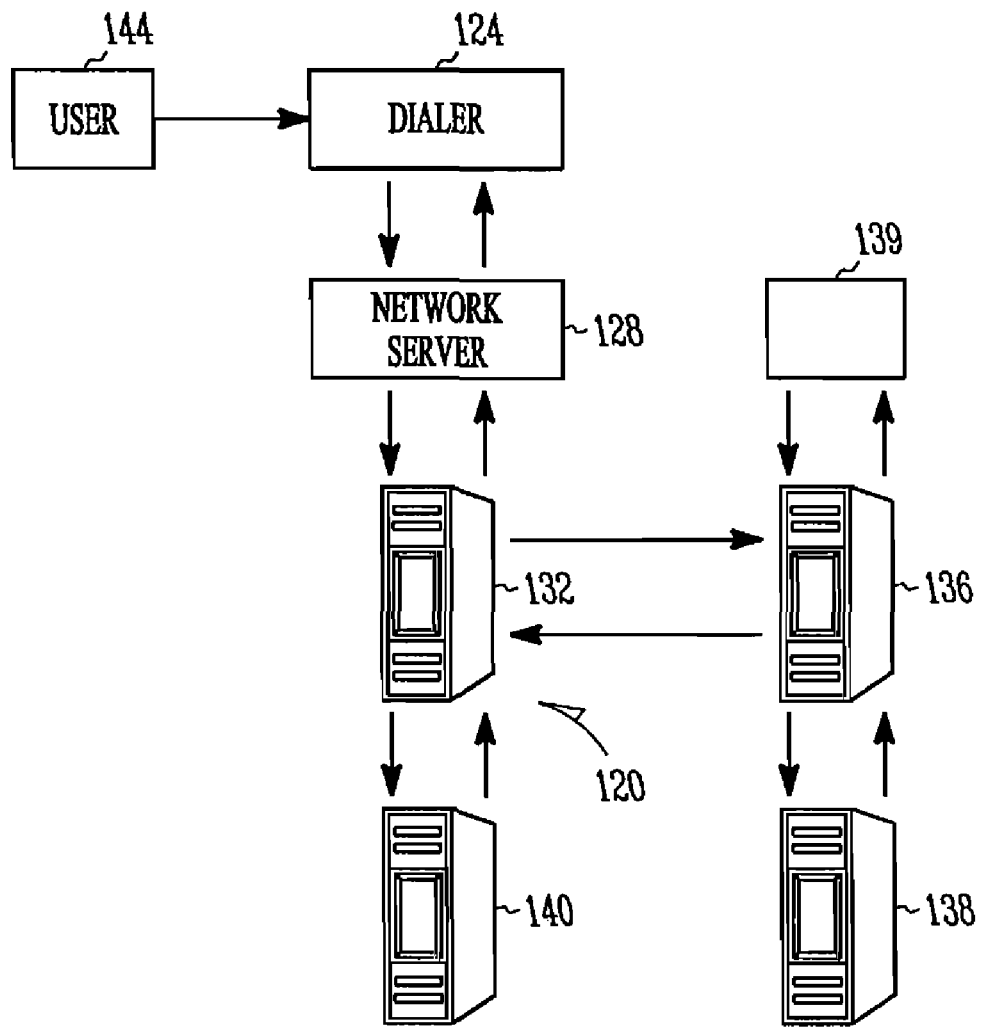
FIG. 5 is a schematic view of a system that utilizes a remote authentication server and a routing server.

FIG. 5 illustrates an embodiment of the present invention referred to as a centralized remote Internet access system 120. The system 120 includes a dialer 124, a local network access server 128, a local authentication server 132, a first routing server 136, a second routing server 138 and a home authentication server 140. The second routing server 138 is an optional component as is discussed below. Additionally, the server 136 includes a link to a domain name server 139. The domain name server 139 is a distributed database that provides the mapping between IP addresses and hostnames.

The dialer 124 comprises commercially available communications software running on a first computer to be connected to a second computer via a modem connection. For example, communications software available in software programs such as Windows 95™, Netscape Navigator™ or Chameleon™ can function as the dialer 124. A user 144 is a person operating the computer on which the dialer software 124 is running.

Most of the components in the system 120 are analogous to components described previously with respect to FIGS. 1-3. The dialer 124 connects to the network server 128 through a modem rack, such as the modem rack 18 shown in FIG. 1. The server 128 is identical to the communication server 22 described previously with respect to FIG. 1, and is commercially available from sources such as Cisco Systems Inc. (Cisco 2500™) and Ascend Communications (Ascend Max 4000™). The server 132 is analogous to the server 14, but includes additional software described below. The server 140 is identical to the server 68. The hardware components of the servers 132, 136 and 140 are commercially available from sources such as SUN, DEC, IBM and HP.

Figure 6:
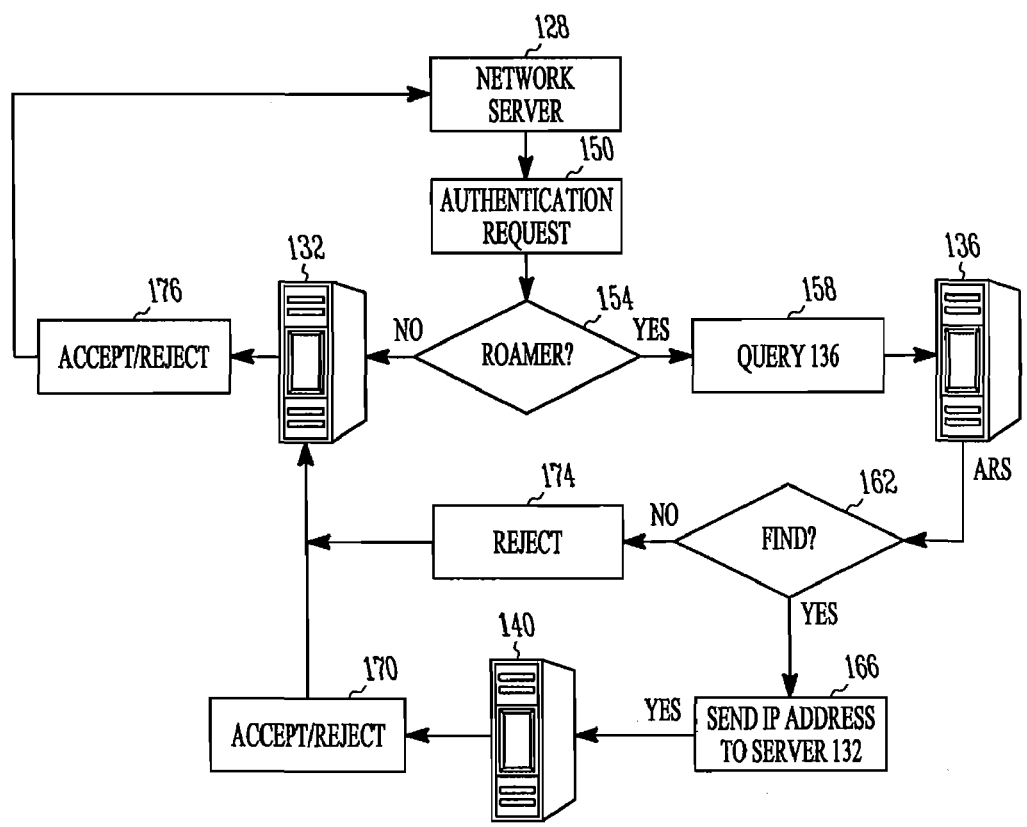
FIG. 6 is a flow chart illustrating the method used by the routing server to verify that a home ISP is available for authenticating user information.

Comparing FIG. 5 to FIG. 3 illustrates that the system 120 includes the routing servers 136 and 138 which are not present in the system shown in FIG. 3. FIG. 6 illustrates the way the server 136 functions in the system 120. The user 144 connects to the system 120 via the dialer 124 and transmits login information as was described previously with respect to FIG. 4. At block 150, the network server 128 issues a request to authenticate the login information. At block 154, the server 132 determines whether or not the login information contains a "roaming" designation such as the @ character followed by additional user information. If roaming information is detected, the server 132 queries the login information to the routing server 136 as indicated by block 158.

Block 162 indicates that the server 136 includes software that attempts to match the "roaming" login information with an entry in a log table in the server 136. If the server 136 can make a match, then at block 166 the server 136 returns information to the server 132 that includes an IP address for a server that has the domain name contained in the login information provided by the user 144. The server 132 then sends an authentication request containing the user's name and password to the server 140. The server 140 checks this information and at block 170, transmits a message to the server 132 either stating that the user 144 should be granted or denied Internet access.

Block 174 indicates that if the server 136 cannot match the "roaming" login information, then a message is sent to the server 132 stating that Internet access should be denied to the user 144.

In another situation, if no roaming information was detected at block 154, then at block 176, the server 132 processes the login information to determine if the user is a customer of the local ISP. The decision to accept or reject the user is then based solely on the user authentication information maintained by the local ISP.

Figure 7:
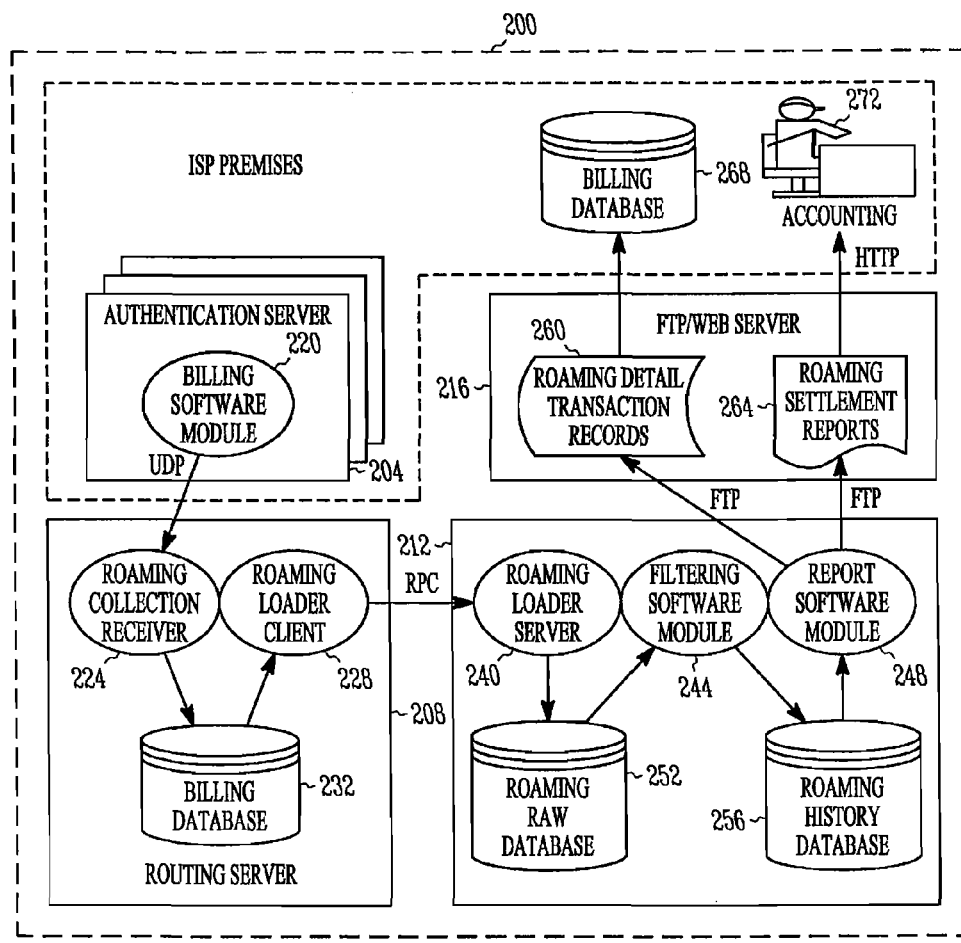
FIG. 7 is a schematic diagram of a system for tracking usage information for users who access the Internet through remote internet service provider according to the present invention.

FIG. 7 illustrates a roaming settlement system 200. The system 200 includes an authentication server 204, a routing server 208 and a central settlement server 212. In the preferred embodiment, the system 200 also includes an FTP/Veb server 216. In the preferred embodiment, the server 204 is an Internet server such as is commercially available from companies like HP, IBM, SUN and DEC. The servers 208 and 212 are Unix compatible servers such as are commercially available from SUN and other companies.

The authentication server 204 includes all of the functions of the server 132 (shown in FIG. 5) and also includes a billing software module 220 which collects data about the identity of the user 144 and the amount of time the user 144 is connected to the Internet as is explained in more detail below. The server 204 is operated by a local Internet Service Provider (local ISP) with whom the user 144 does not have an account. As explained previously with respect to the server 132 shown in FIGS. 5 and 6, the server 204 allows the user 144 to accesses the Internet through the system 63 operated by a local ISP (See FIG. 3).

In the preferred embodiment, the billing software module 220 collects data about the transaction in which the user 144 accesses the Internet. This data is referred to as the RADIUS accounting records and includes information of the following type: 1. user name; 2. user domain; 3. start time; 4. local server 204 address; 5. home server 68 address; 6. session ID; 7. communications server 22 ID; 8. account delay time; 9. account session time; 10. status (always 0); 11. account status type; 12. start time (GMT); and 13. time zone. The RADIUS records are transmitted to the server 208 over the Internet, for example using Unix Datagram Protocol (UDP).

The routing server 208 includes all of the functions of the server 136 (shown in FIG. 5) and also includes a roaming collection receiver software module 224, a roaming loader client software module 228 and an unprocessed file database 232. The software module 224 receives the RADIUS records from the server 204 and stores them in the database 232. The database 232 comprises a directory on the hard drive of the server 208. A new file is created in the directory each time the user 144 connects to the Internet through the server 204, a new file is created in the directory. The files comprise data derived from the RADIUS packets. The software module 224 may remove some fields from the RADIUS record or packet before it is stored in the database 232. For example, the number of octets may be reduced and/or the termination cause fields may be removed.

Preferably, the module 220 attempts to send each RADIUS record to the module 224 as soon as the record is created by the module 220. The module 220 continues attempting the transmission of the RADIUS record until an acknowledgment is received by the module 220 that the module 224 has received the transmission. The software module 228 generates remote process calls (RPC) to the server 212 and sends the raw roaming data from the database 232 to the server 212.

In the preferred embodiment, the server 208 is not located at the same physical location as the server 204. Rather, a purpose of the server 208 is to collect RADIUS records (or similar data) from a plurality of the servers 204 which are operated by many different local ISP's. Each server 204 would have a software module 220. For example, seventy-five different local ISP's in Japan, China, Taiwan and other countries could each have a server 204. A single server 208 could be located in Singapore for gathering the RADIUS records (or similar data) from each of the seventy-five servers 204 operated by the local ISP's.

The central settlement server 212 includes a roaming loader server software module 240, a filtering software module 244, a report software module 248, a roaming raw database 252 and a roaming history database 256. The software module 240 receives daily requests from the software module 228 to transfer data from the database 232 to the server 212. When the data is received at the server 212, the module 240 causes the data to be stored in the database 252. The filtering software module 244 processes ("cleans") the data stored in the database 252 to put the data in a form that can be incorporated into reports. After data has been cleaned by the module 244, it is stored in the data base 256.

Data is input into the roaming raw database 252 in a particular format. For example, in the preferred embodiment, each line of the input file is a record consisting of seventeen fields. The seventeen fields are: 1. user name; 2. user domain; 3. account status type; 4. account session ID; 5. account session time; 6. account delay time; 7. communications server 22 (NAS) identifier; 8. local AAS ID; 9. Home AAS ID; 10. stop time (GMT); 11. stop time (local); 12. time zone; 13. entry ID; 14. create date; 15. time put in roaming history database 256 (RHDB); 16. record status; and 17. pair status (refers to start/stop records). Preferably, the software module 228 transforms the data from the database 232 into this format that will be input to the database 252 before the data is sent from the server 208 to the server 212. However, in other embodiments, the module 240 could perform this function.

Data is outputted from the roaming raw database 252 in the same format as it was inputted and is processed ("cleaned") by the filtering software module 244. Data cleaning is required to remove duplicate records, remove irrelevant records and remove error records. Records relating to the same basic service type but different service sources may have slightly different record formats. The data cleaning operation also reformats nonconforming records into a normalized form for each basic service type.

Duplicate records may result from low level protocols used in the initial data collection transmissions which send retry records whenever an acknowledgment of receipt is not received within a specified time. Multiple records are recognized as duplicates of the same usage occurrence by some number of record fields which define uniqueness within some time period. The time factor is a necessary consideration since identification fields have a limited length and so may reach their maximum values, and rollover to the initial value, within some time period.

Irrelevant records may result from a richness in the record source beyond that required for usage measurement. These may be informational or error conditions not directly related to billable service usage. These records are not entered into the database 256.

After the data has been cleaned by the software module 244, it is stored in the roaming history database 256. In the preferred embodiment the databases 252 and 256 are Oracle® databases. The server 212 is a SUN or SUN compatible (i.e. SPARC® microprocessor) server running the Solaris® operating system. Other types of servers, operating systems and databases could also be used in the present invention.

The report software module 248 takes data from the database 256 and uses it to generate settlement reports that describe the amount of time the user 144 was connected to the Internet through the system operated by the local ISP (i.e. by the local ISP who operates the server 204). Once the reports are generated by the module 248, they are stored in a local file system on the server 212. The reports are then transmitted to the server 216 by FTP.

The reports generated by the module 248 also identify the home ISP for the user 144 (i.e. the ISP who operates the server 140), so that the fees due for the usage of the Internet connection by the user 144 can be charged to the home ISP and credited to the local ISP. Normally, the usage data is also processed according to certain criteria to yield a monetary amount associated with the usage. For example, for each record in the database 256, a consumer rate and a provider rate is applied to the units of usage. From the multiplication of these rates over the usage units a monetary amount is determined. The rates may be structured as a single flat rate for all similar usage or as a variable rate based upon such factors as geographic location of the service usage, time or date of usage, identity of the service provider, identity of the service consumer and/or identity of the consumer's associated ISP. The monetary amounts are expressed in a single currency. Additionally, a charge is usually added to compensate the settlement operator (discussed below) for processing the accounts and/or providing other services related to the system 200.

In the preferred embodiment of the present invention, the finds due and/or owed to the various home and local ISP's are collected by a single entity, referred to as the settlement operator, that operates the servers 212, 208 and 216. The settlement operator collects funds from all ISPs who owe monetary amounts as shown on their settlement reports. These amounts are due within a well defined time period. When received, these funds are deposited into a bank account where they are available for disbursement to ISPs who are owed monetary amounts as shown on their settlement reports. The disbursements are due within a well defined time period which is longer than the time given for payment due to the settlement operator.

Two methodologies may be employed for disbursement of funds. The preferred methodology is to guarantee payments to ISPs who are due funds even though sufficient funds have not yet been received by related service consuming ISPs. Adequate cash flow to enable continuous operation by this method requires submission of adequate prepayments or letters of credit by each potential service consumer to the settlement operator based upon expected usage levels. This method also requires periodic monitoring of debts incurred to ensure that adequate capital or credit is available. If not adequate, the prepayment or credit must be increased. If these are not secured, then service must be denied to the ISP.

Another methodology is to withhold payments which are not adequately covered by amounts received and available in the disbursement account. At any given time each ISP may only be paid the aggregate amount received from those ISPs who consumed the services. As amounts due from service consumers are remitted, payments may be made. This methodology is more complicated and requires matching of related ISP accounts and amounts during the collection and disbursement process. It may also decrease confidence in the soundness of the settlement system by those who are owed funds.

On a regular periodic basis, settlement reports are generated by the software module 248 which document service usage between ISPs. The settlement operator provides four types of reports to each ISP participant: Detail, Summary, Invoice and Credit/Debit. FIG. 8 illustrates a Detail Report. A Detail Report shows service usage aggregated by user and contains other groupings to enable derivation of monetary amounts, such as the country. and telephone prefix, as appropriate. FIG. 9 illustrates a Summary Report. A Summary Report sums these usage units for each pair of ISPs. FIG. 10 illustrates an Invoice Report. An Invoice Report converts the usage representations in the Summary Report to monetary amounts, e.g. minutes to dollars. There is one of these first three reports for each service consumed or provided by an ISP. Finally a Credit/Debit Report nets the credits and debits resulting from all the Invoice Reports and presents a consolidated statement of the amount due or owed to each other ISP and to the entire set of cooperating ISPs in total. FIG. 11 illustrates a Credit/Debit Report. Obviously, other types of reports can be prepared based on the information stored in the database 256.

Referring to FIG. 8, each of the ISPs A-J would be a member of a group that has agreed to use the system 200 (GRIC members). Each of the ISPs A-J would operate at least one server 204. FIG. 8 illustrates that a user (user1@isp_b), who has an account with ISP B in country 2, accessed the Internet through the system of ISP A in country 1 twenty-eight times, for a total of 108 minutes during this billing period. A user (user1@isp_a), who has an account with ISP A in country 1, accessed the Internet through the system of ISP C in country 3 two times, for a total of nine minutes during this billing period. Similar information for ISPs D-J appears in FIG. 8.

FIG. 9 summarizes the information in FIG. 8. FIG. 10 converts the information from FIG. 9 into monetary amounts and also adds a monetary fee for use of the servers 208, 212 and 216 (ARS Handle Fees) based on the total time connected to the Internet and the number of connections. FIG. 11 summarizes which charges are credits and which are debits for each ISP, and calculates a net amount due from or owed to the ISP. Generally, when a local ISP is providing Internet access to a user who has an account with a home ISP, the local ISP receives a credit, and the home ISP receives a debit (i.e. the home ISP owes money for the transaction, including the ARS handling fees, and the local ISP will be paid money for providing the Internet access). For example, FIG. 11 shows that the settlement operator owes ISP A $5.54. The settlement operator will collect this amount from the ISPs who have debits that yielded this amount, along with the proper ARS handling fee.

Example 1 below is an example of a detail transaction record in ASCII format. Generally, the detail transaction record would include additional similar entries for a plurality of other users who had utilized the particular ISP's service.

EXAMPLE 1

"DT", "RM", "Jul. 10, 1997", "01:43::35", "Jun. 30, 1997", "18:43:35", user1@aimnet.com, "Aimnet;USA", "Connect.com;Australia", "S", "300"

The entries in Example 1 have the following meanings: "DT"—means report type (i.e. detail transaction), "RM"— means service type (i.e. roaming), "Jul. 10, 1997" and "01:43::35" are the date and time the transaction terminated (in Greenich Mean Time):"Jun. 30, 1997" and "18:43:35" are the date and time the transaction terminated (in local time). "user1@aimnet.com" and "Aimnet;USA" are the identifiers for the user 144 and his or her home ISP, "Connect.com and Australia" are the identifier and country for the local ISP, "S" means units of time for the duration of the transaction (i.e. seconds), and "300" means the duration of the transaction (i.e. 300 seconds of Internet connection time).

Once the settlement reports have been generated, they are made available to the home and local ISP's via mail, facsimile, e-mail, and/or the World Wide Web (HTML transmitted over HTTP). Other types of reports, such as the detail transaction record shown in Example 1 are sent to the local ISP's as an ASCII file 260 by the server 216 using file transfer protocol (FTP). In the preferred embodiment, the server 216 is a combination world wide web (WWW) and FTP server which allows the settlement reports to be published on a web-page or sent by FTP. The servers 212 and 216 are preferably connected by an "intranet" operated by the settlement operator.

FIG. 7 illustrates that in the preferred embodiment, the reports shown in FIGS. 8, 9, 10 and 11 are posted on a web page 264. The detail transaction record shown in Example 1 is sent as the ASCII file 260. This allows the ISP to download the detail transaction records directly to a database 268 and to view and/or download the other reports directly at an accounting site 272. The database 268 is used, for example, to generate invoices for the users 144 who have accounts with the home ISP (i.e. for users who have used another ISP to gain access to the Internet and now must pay their home ISP). Preferably the ASCII file 260 and web page 264 are secure (e.g. by password protection) so that only a designated ISP can view a specified report.

Generally, the servers 212 and 216 are located at a geographic location that is different than the location of the servers 208 and 204. Typically, several of the servers 208 (e.g. 2-4) are in communication with one central settlement server 212. Of course, depending on the circumstances, the number of servers 208 could be increased or decreased. Furthermore, more than one server 212 could be utilized, although a single server 212 is the preferred number. As indicated in FIG. 7, in the preferred embodiment the server 204 is located at the ISPs' premises, along with the billing database 268 and the accounting site 272. When a report is published by the server 216, it is usually transmitted to, or made available to, the accounting site 272 and/or the database 268 located at both the home ISP and the local ISP. The home ISP needs the reports so that billing to the user 144 can be generated. The local ISP needs the reports so that the amount of money or credit owed to the local ISP can be tracked.

Use of the system 200 is not limited to use with Internet roaming technology. Rather, it can also be used to provide accounting information for other Internet services such as Internet faxing or Internet phone calls. The generalized steps in the process are: using a first server to track an amount of time a first user is connected to the Internet through a first system operated by a first Internet Service Provider with whom the first user does not have an account (for Internet roaming) or the amount of time for some other service (like faxing, phone call, etc.); transmitting a user record from the first server to a central settlement server, the user record comprising data that includes an identifier for the first user and the amount of time the first user was connected to the Internet through the first system; and using the central settlement server to generate a report from the user record, the report including at least the amount of time the first user was connected to the Internet through the first system. Of course the user record can be routed through a second server as described previously with respect to the server 208. If the server 208 is not used, some or all of the functions of the server 208 can be incorporated into the server 204.

Figure 12:
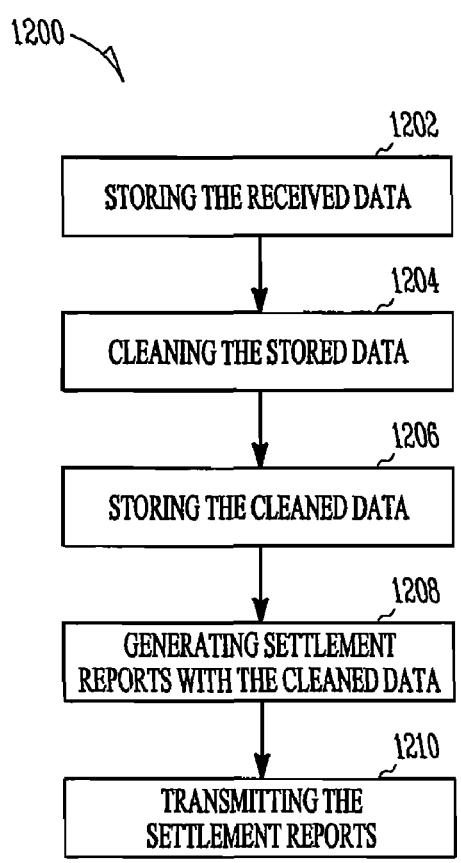
FIG. 12 is a flowchart according to the present invention.

FIG. 12 is a flowchart 1200 according to the present invention. The operations of the flowchart 1200 begin at block 1202. At block 1202, the received data is stored. The operations of the flowchart 1200 continue at block 1204. At block 1204, the stored data is cleaned. The operations of the flowchart 1200 continue at block 1206. At block 1206, the cleaned data is stored. The operations of the flowchart 1200 continue at block 1208. At block 1208, the settlement reports are generated with the cleaned data. The operations of the flowchart 1200 continue at block 1210. At block 1210, the settlement reports are transmitted.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A system comprising:
   a routing server comprising:
      a collection module, to execute in a processor of the routing server, to receive accounting records of a user's Internet connection service usage of a network of the local Internet service provider, the local Internet service provider operated independently from a home Internet service provider of the user, the user not having an account with the local Internet service provider but having an account with the home Internet service provider and connecting to the Internet via the local Internet service provider; and
   a settlement server comprising:
      a loader, to execute in a processor of the settlement server, to receive and collect the accounting records from the routing server for a period of time; and
      a report module, to execute in the processor of the settlement server, to generate a report of service usage for the period of time and to transmit the report of service usage to the home Internet service provider over the Internet.

2. The system of claim 1, wherein the settlement server further comprises:
   a filtering module, to execute in the processor of the settlement server, to filter the accounting records to correct the data prior to generation of the report.

3. The system of claim 1, further comprising:
   a database capable of storing the accounting records of the user's Internet connection service usage of the network of the local Internet service provider.

4. The system of claim 1, further comprising:
   an authentication server to enable access to the network of the local Internet service provider for the user.

5. The system of claim 4, the authentication server further comprising:
   a billing module, to execute in a processor of the authentication server, to collect data about an identity of the user and an amount of time that the user is connected to the Internet, to generate the accounting records from the collected data, and to provide the accounting records to the routing server.

6. A system comprising:
a memory;
one or more processors coupled to said memory comprising:
   a loader, to execute in the one or more processors, to receive from a local Internet service provider over the Internet accounting records of a user's Internet connection service usage of a network of the local Internet service provider, the local Internet service provider operated independently from a home Internet service provider of the user, the user not having an account with the local Internet service provider but having an account with the home Internet service provider and connecting to the Internet via the local Internet service provider;
   a reporting module, coupled to the loader to execute in the one or more processors, to generate reports from the accounting records to be sent to the home Internet service provider over the Internet.

7. The system of claim 6, further comprising:
a filter, coupled to the loader to execute in the one or more processors, to generate filtered accounting records by removing erroneous data from the accounting records received by the loader for access by the reporting module.

8. A method comprising:
receiving, by one or more processors, accounting records of a user's Internet connection service usage of a network of a local Internet service provider from the local Internet service provider, the local Internet service provider operated independently from a home Internet service provider of the user, the user not having an account with the local Internet service provider but having an account with the home Internet service provider and connecting to the Internet via the local Internet service provider;
generating, by the one or more processors, a report of service usage by the user from the accounting records; and
transmitting, by the one or more processors, the report of service usage to the home Internet service provider over the Internet.

9. The method of claim 8, wherein generating a report of service usage by the user from the accounting records comprises:
   categorizing, by the one or more processors, the accounting records by the home Internet service provider; and
   aggregating, by the one or more processors, the accounting records corresponding to a period of time for which the accounting records were collected.

10. The method of claim 8, wherein generating a report of service usage by the user from the accounting records comprises:
   categorizing, by the one or more processors, the accounting records by the local Internet service provider; and
   aggregating, by the one or more processors, the accounting records corresponding to a period of time for which the account records were collected.

11. The method of claim 8, wherein generating a report of service usage by the user from the accounting records comprises:
   filtering, by the one or more processors, the accounting records; and
   generating, by the one or more processors, a report of service by the user from the filtered accounting records.

12. The method of claim 11, wherein filtering the accounting records comprises:
   removing, by the one or more processors, irrelevant records from the accounting records.

13. The method of claim 11, wherein filtering the accounting records comprises:
   removing, by the one or more processors, error records from the accounting records.

14. The method of claim 11, wherein filtering the accounting records comprises:
   reformatting, by the one or more processors, non-conforming records of the accounting records into a normalized form.

15. The method of claim 8, further comprising:
   multiplying, by the one or more processors, a time period that the user was provided service by the local Internet service provider by a rate corresponding to a negotiated rate of the user's home Internet service provider.

16. The method of claim 8, further comprising:
   categorizing, by the one or more processors, a time that the user was provided service by a plurality of geographic locations; and
   multiplying, by the one or more processors, a time in the plurality of geographic locations by a rate corresponding to a charge for service in the plurality of geographic locations for the user's home Internet service provider.

17. The method of claim 8, further comprising:
   categorizing, by the one or more processors, a time period that the user was provided service by the local Internet service provider; and
   multiplying, by the one or more processors, a time the user was provided service by the local Internet service provider by a rate corresponding to a charge for using the local Internet service provider for the user's home Internet service provider.

18. A machine-readable medium comprising computer-executable instructions, which when executed by a machine, cause the machine to:
   receive accounting records of a user's Internet connection service usage of a network of a local Internet service provider from the local Internet service provider, the local Internet service provider operated independently from a home Internet service provider of the user, the user not having an account with the local Internet service provider but having an account with the home Internet service provider and connecting to the Internet via the local Internet service provider;
   generate a report of service by the user from the accounting records; and
   transmit the report of service usage to the home Internet service provider over the Internet.

19. The machine-readable medium of claim 18, wherein causing the machine to generate a report of service by the user from the accounting records causes the machine to:
   filter the accounting records; and generate a report of service by the user from the filtered accounting records.

20. The machine-readable medium of claim 18, further comprising instructions that causes the machine to:
   categorize a time that the user was provided service by a plurality of geographic locations; and
   multiply a time in the plurality of geographic locations by a rate corresponding to a charge for service in the plurality of geographic locations for the user's home Internet service provider.

* * * * *